United States Patent
Lee et al.

(10) Patent No.: US 9,976,856 B2
(45) Date of Patent: May 22, 2018

(54) USER TERMINAL, METHOD AND LOCATION TRACKING SYSTEM FOR RECEIVING UNIQUE IDENTIFIER USING MAGNETIC FIELD

(71) Applicant: SAMSUNG ELECTRONICS CO., LTD., Suwon-si (KR)

(72) Inventors: Byeong-hu Lee, Suwon-si (KR); Yong-hee Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 14/684,960

(22) Filed: Apr. 13, 2015

(65) Prior Publication Data

US 2016/0003604 A1 Jan. 7, 2016

(30) Foreign Application Priority Data

Jul. 2, 2014 (KR) ........................ 10-2014-0082287

(51) Int. Cl.
*G01C 17/02* (2006.01)

(52) U.S. Cl.
CPC .................................. *G01C 17/02* (2013.01)

(58) Field of Classification Search
CPC .................................. G01C 17/02; G01B 7/00
See application file for complete search history.

(56) References Cited

U.S. PATENT DOCUMENTS

| | | | |
|---|---|---|---|
| 7,268,564 B2 * | 9/2007 | Ozaki | G01R 29/0857 324/632 |
| 7,532,901 B1 * | 5/2009 | LaFranchise | H04M 1/6066 178/19.04 |
| 7,637,024 B2 | 12/2009 | Amundson et al. | |
| 8,352,639 B2 * | 1/2013 | Dods | H04W 88/00 455/456.6 |
| 8,855,671 B1 * | 10/2014 | Mirov | H04W 64/00 455/404.2 |
| 9,113,305 B2 * | 8/2015 | Lim | H04W 4/025 |
| 2005/0221858 A1 * | 10/2005 | Hoddie | H04W 28/16 455/557 |
| 2010/0110837 A1 * | 5/2010 | Jung | H04B 11/00 367/137 |
| 2010/0189312 A1 * | 7/2010 | Nielsen | G01C 15/02 382/113 |
| 2010/0252622 A1 * | 10/2010 | Bedore | G06K 7/0008 235/380 |
| 2010/0277304 A1 * | 11/2010 | Haartsen | G06F 1/3215 340/531 |

(Continued)

FOREIGN PATENT DOCUMENTS

| | | |
|---|---|---|
| EP | 2533018 A1 | 12/2012 |
| JP | 06-121010 A | 4/1994 |

(Continued)

*Primary Examiner* — Lewis West
(74) *Attorney, Agent, or Firm* — Sughrue Mion, PLLC

(57) ABSTRACT

A method for controlling a user terminal includes obtaining reference magnetic field information of the user terminal, detecting a magnetic field emitted from an external mobile terminal, and obtaining location information indicating a location of the external mobile terminal based on the reference magnetic field information and the detected magnetic field.

20 Claims, 12 Drawing Sheets

(56) References Cited

U.S. PATENT DOCUMENTS

| | | | | |
|---|---|---|---|---|
| 2011/0046999 A1* | 2/2011 | Nielsen | ............... | G06Q 10/063 705/7.39 |
| 2011/0070826 A1* | 3/2011 | Griffin | ............... | H04B 5/02 455/41.1 |
| 2011/0294517 A1* | 12/2011 | Hahm | ............... | G01C 17/28 455/456.1 |
| 2012/0295634 A1* | 11/2012 | Kim | ............... | H02J 7/025 455/456.1 |
| 2013/0053062 A1 | 2/2013 | Kim et al. | | |
| 2013/0057260 A1 | 3/2013 | Kim et al. | | |
| 2013/0109310 A1* | 5/2013 | Mine | ............... | G06F 3/0488 455/41.1 |
| 2013/0285649 A1 | 10/2013 | van der Kuij et al. | | |
| 2013/0307553 A1 | 11/2013 | Fukada et al. | | |
| 2014/0194143 A1* | 7/2014 | Krainz | ............... | G01S 5/06 455/456.1 |
| 2014/0323162 A1* | 10/2014 | Ezra | ............... | G01S 5/0072 455/457 |
| 2014/0342671 A1* | 11/2014 | Kim | ............... | H04W 4/008 455/41.3 |
| 2015/0097554 A1* | 4/2015 | Park | ............... | G01C 21/08 324/207.14 |
| 2016/0088707 A1* | 3/2016 | Van De Sluis | .... | H05B 37/0227 315/149 |
| 2016/0180440 A1* | 6/2016 | Dibenedetto | ........... | G06F 19/34 705/26.7 |
| 2016/0224777 A1* | 8/2016 | Rebelo | ............... | G06F 21/32 |

FOREIGN PATENT DOCUMENTS

| | | |
|---|---|---|
| JP | 2005-117539 A | 4/2005 |
| JP | 5386698 B2 | 1/2014 |
| KR | 10-2002-0008226 A | 1/2002 |
| KR | 10-2002-0048526 A | 6/2002 |
| KR | 10-2007-0045136 A | 5/2007 |
| KR | 10-2012-0137285 A | 12/2012 |
| KR | 10-2013-0021616 A | 3/2013 |
| KR | 10-2013-0025484 A | 3/2013 |
| KR | 10-2013-0119352 A | 10/2013 |
| KR | 10-2013-0120409 A | 11/2013 |
| KR | 10-2013-0122461 A | 11/2013 |

* cited by examiner

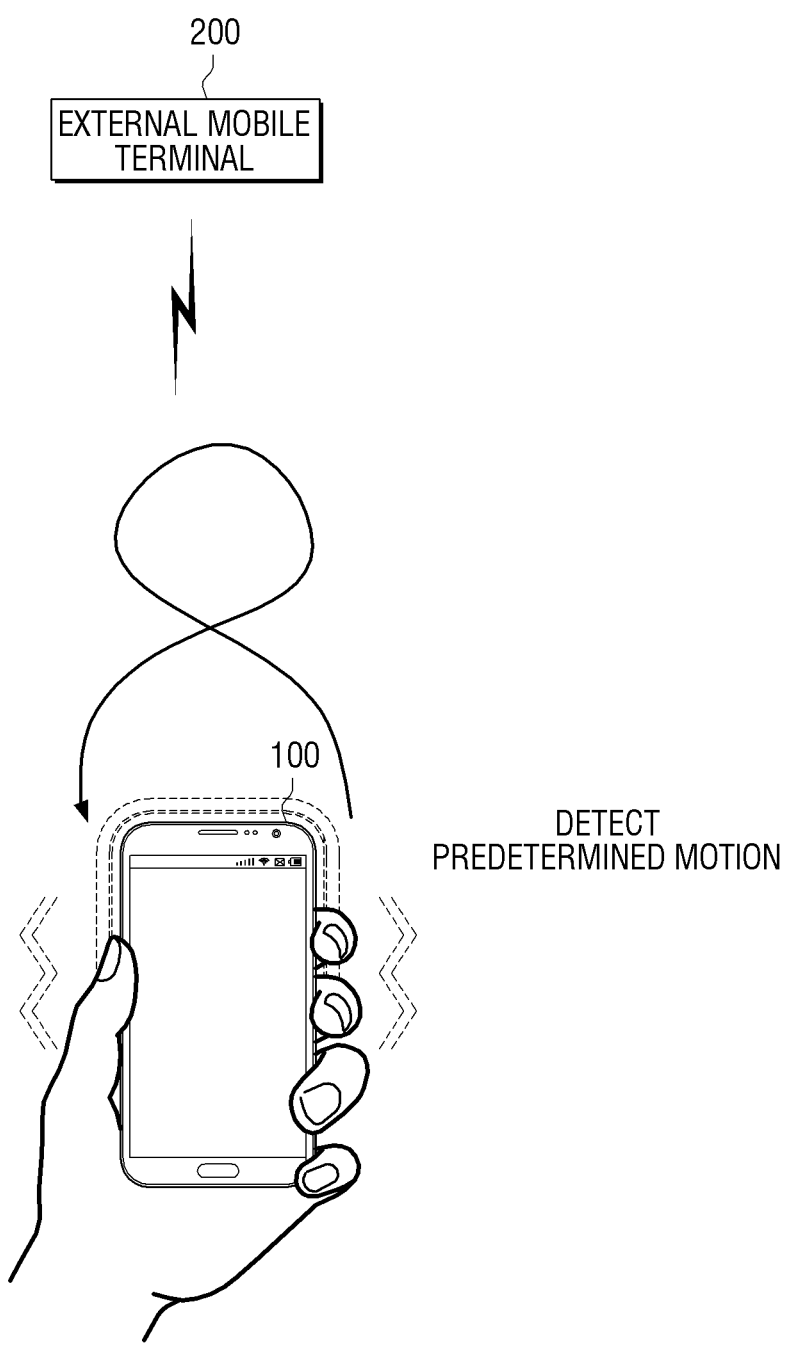

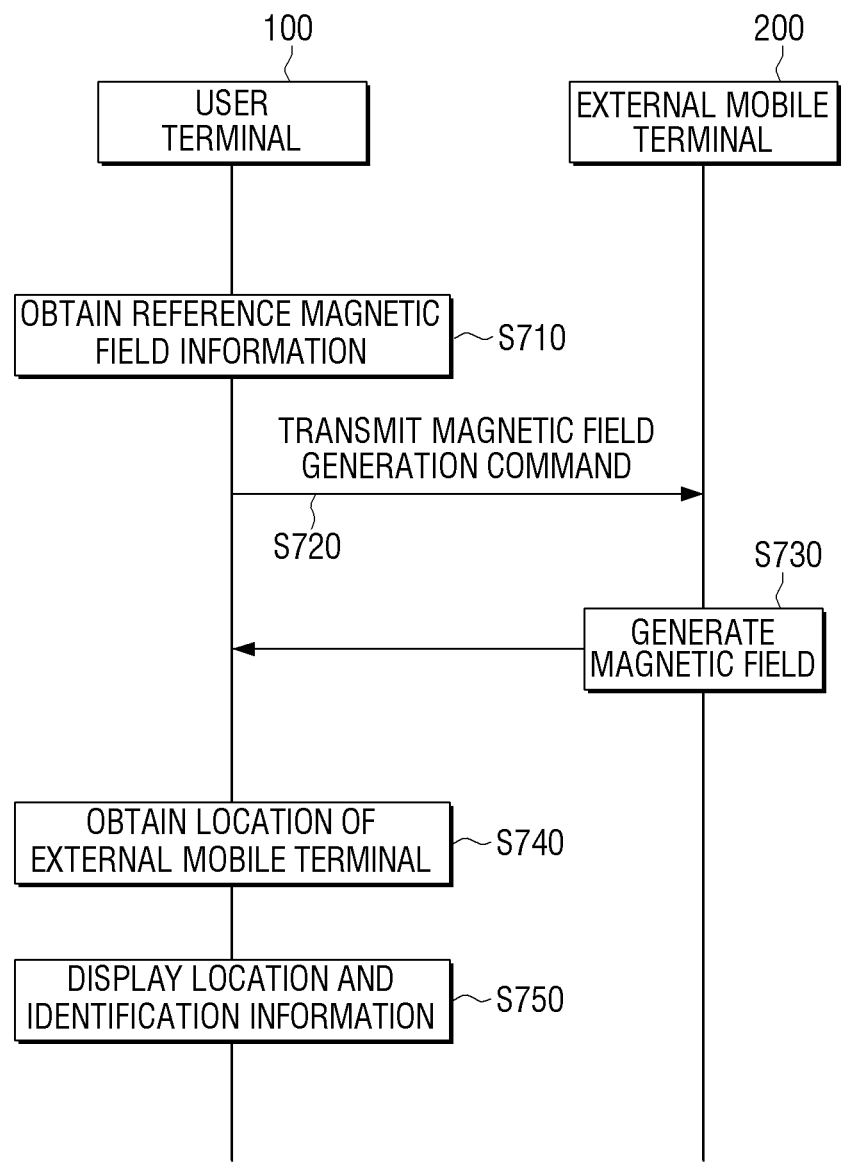

USER TERMINAL, METHOD AND LOCATION TRACKING SYSTEM FOR RECEIVING UNIQUE IDENTIFIER USING MAGNETIC FIELD

CROSS-REFERENCE TO RELATED APPLICATION

This application claims priority from Korean Patent Application No. 10-2014-0082287, filed in the Korean Intellectual Property Office on Jul. 2, 2014, the entire disclosure of which is incorporated herein by reference in its entirety.

BACKGROUND

1. Field

Aspects of the exemplary embodiments relate to a user terminal, a method and a location tracking system for receiving a unique identifier using a magnetic field, and more particularly, to a user terminal, a method and an audio system for obtaining reference magnetic field information of a user terminal, detecting magnetic information corresponding to identification information from an external mobile terminal and obtaining location information of the external mobile terminal based on the reference magnetic field information and the detected magnetic field.

2. Description of the Related Art

With the development of electronic technology, various types of electronic products have been developed and distributed. Recently, a mobile digital apparatus such as a smart phone has been developed in various forms and used widely in various locations, such as houses.

A mobile digital apparatus of the related art, such as a smart phone of the related art, may be easy for a user to carry around, but has a risk of being lost because of its small size and light weight.

Accordingly, various technologies have been developed to find the location of a mobile digital apparatus, such as a smart phone, using a geo-magnetic sensor, Wi-Fi device or GPS provided therein, which may indicate the direction of the apparatus when the mobile digital apparatus has been lost.

However, such a geo-magnetic sensor, Wi-Fi device or GPS may merely detect an approximate location of a mobile digital apparatus, rather than detecting a precise location of the mobile digital apparatus.

SUMMARY

An aspect of the exemplary embodiments relates to a user terminal, a method and an audio system for obtaining reference magnetic field information of a user terminal, detecting magnetic information corresponding to identification information from an external mobile terminal and obtaining location information of the external mobile terminal based on the reference magnetic field information and the detected magnetic field.

According to an exemplary embodiment, there is provided a method for controlling a user terminal, including obtaining reference magnetic field information of the user terminal, detecting a magnetic field emitted from an external mobile terminal, and obtaining location information indicating a location of the external mobile terminal based on the reference magnetic field information and the detected magnetic field.

The obtaining of the reference magnetic field information of the user terminal may include removing an effect of an internal magnetic field of the user terminal in response to a predetermined motion of the user terminal being detected by the user terminal.

The obtaining of the reference magnetic field information of the user terminal may include detecting the predetermined motion of the user terminal after the user terminal is detected as being within a predetermined range of the external mobile terminal.

The method may further include, in response to a magnetic field generation command being input to the user terminal, transmitting the magnetic field generation command to the external mobile terminal, and the external mobile terminal may emit a magnetic field between a maximum value and a minimum value in response to the magnetic field generation command.

The user terminal may receive information regarding a maximum value and a minimum value of the magnetic field emitted by the external mobile terminal, and the obtaining of the location information indicating a location of the external mobile terminal may include obtaining distance information of the external mobile terminal by comparing the received information regarding the maximum value and the minimum value of the magnetic field with maximum value information and minimum value information of the detected magnetic field.

The obtaining of the location information indicating a location of the external mobile terminal may include obtaining direction information of the external mobile terminal by comparing the reference magnetic field information with the detected magnetic field.

The method may further include obtaining identification information of the external mobile terminal, the identification information being a quantized value between a maximum value and a minimum value of the magnetic field emitted from the external mobile terminal.

The method may further include displaying the obtained location information and the obtained identification information of the external mobile terminal.

According to another exemplary embodiment, there is provided a user terminal including a magnetic field detector configured to obtain reference magnetic field information of the user terminal and detect a magnetic field which is emitted by an external mobile terminal, and a controller configured to obtain location information indicating a location of the external mobile terminal based on the reference magnetic field information and the detected magnetic field.

The controller may be configured to control the magnetic field detector to obtain the reference magnetic field information by removing an effect of an internal magnetic field of the user terminal in response to a predetermined motion of the user terminal being detected by the user terminal.

The controller may be configured to control the magnetic field detector to detect the predetermined motion of the user terminal after detecting that the user terminal is within a predetermined range of the external mobile terminal.

The user terminal may further include a communication configured to communicate with the external mobile terminal, and the controller, in response to detecting that a magnetic field generation command is input to the user terminal, may be configured to control the communicator to transmit the magnetic field generation command to the external mobile terminal, the magnetic field generation command being configured to control the external mobile terminal to emit the magnetic field between a maximum value and a minimum value in response to the magnetic field generation command.

The user terminal may be configured to receive information regarding a maximum value and a minimum value of the magnetic field which is emitted by the external mobile terminal, and the controller may be configured to obtain distance information of the external mobile terminal by comparing the received information regarding the maximum value and the minimum value of the magnetic field with maximum value information and minimum value information of the detected magnetic field.

The controller may be configured to obtain direction information of the external mobile terminal by comparing the reference magnetic field information with the detected magnetic field.

The controller may be further configured to obtain identification information of the external mobile terminal, the identification information being a quantized value between a maximum value and a minimum value of the magnetic field which is emitted by the external mobile terminal.

The user terminal may further include a display configured to display the obtained location information and the obtained identification information of the external mobile terminal.

BRIEF DESCRIPTION OF THE DRAWINGS

The above and/or other aspects of the exemplary embodiments will be more apparent by describing certain exemplary embodiments with reference to the accompanying drawings, in which:

FIGS. 4A, 4B, 4C and 4D are views for obtaining location information of an external mobile terminal using a user terminal according to an exemplary embodiment;

FIG. 7 is a sequence view provided to explain an operation of a location tracking system according to an exemplary embodiment.

DETAILED DESCRIPTION

Figure 1:
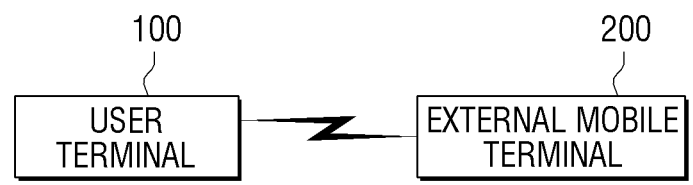
FIG. 1 is a view illustrating a location tracking system according to an exemplary embodiment.

Hereinafter, certain exemplary embodiments will be described in detail with reference to the accompanying drawings. In the following description, the same reference numerals are used for analogous elements when the analogous elements are depicted in different drawings. The matters defined in the description, such as a detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

In the present disclosure, relational terms such as first and second, and the like, may be used to distinguish one entity from another entity, without necessarily implying any actual relationship or order between such entities.

FIG. 1 is a view illustrating a location tracking system according to an exemplary embodiment. According to FIG. 1, the location tracking system of an external mobile terminal includes a user terminal 100 and an external mobile terminal 200.

The user terminal 100 may perform inter-communication by freely moving with a service area provided by a base station, and may be various types of apparatuses which can be carried by a user, such as a cellular phone, a personal Communication Service (PSC) phone, a navigation device, etc. In some cases, the user terminal 100 may be realized as a mobile communication terminal such as a Personal Digital Assistant (PDA), a Hand-Held PC, a Global System for Mobile (GSM) phone, a Wideband CDMA (W-CDMA) phone, a CDMA-2000 phone, a Mobile Broadband System (MBS) phone, etc.

The user terminal 100 may obtain reference magnetic field information. Subsequently, the user terminal 100 may detect a magnetic field corresponding to identification information from an external mobile terminal 200. In this case, the user terminal 100 may obtain location information of the external mobile terminal 200 based on the obtained reference magnetic field information and the detected magnetic field.

Specifically, if the external mobile terminal 200 is located nearby and a predetermined motion is detected, the user terminal 100 may obtain reference magnetic field information by removing the influence of an internal magnetic field. In this case, if a magnetic field generation command is input by a user, the user terminal 100 may transmit the magnetic field generation command to the external mobile terminal 200. Subsequently, in response to the magnetic field generation command, the external mobile terminal 200 may emit a magnetic field between a maximum value and a minimum value for a predetermined time.

In addition, identification information of the external mobile terminal 200 may be a quantized value in a magnetic field size between a maximum value and a minimum value of a magnetic field generated by the external mobile terminal 200.

The user terminal 100 may receive information regarding the maximum value and a minimum value of a magnetic field generated by the external mobile terminal 200 and obtain distance information of the external mobile terminal 200 by comparing the information regarding the received maximum value and minimum value of the magnetic field and the information regarding the detected maximum value and minimum value of the magnetic field.

In addition, the user terminal 100 may obtain direction information of the external mobile terminal 200 by comparing the reference magnetic field information with the detected magnetic field.

Similar to the user terminal 100, the external mobile phone 200 may be implemented as various types of apparatuses which can be used by a user, such as a cellular phone, a Personal Communication Service (PCS) phone, a navigation device, etc. In some cases, the user terminal 100 may be realized as a mobile communication terminal such as a Personal Digital Assistant (PDA), a Hand-Held PC, a Global System for Mobile (GSM) phone, a Wideband CDMA (W-CDMA) phone, a CDMA-2000 phone, a Mobile Broadband System (MBS) phone, etc. In addition, the external mobile phone 200 may be realized as a remote controller which can be carried by a user.

The user terminal 100 and the external mobile terminal 200 are not limited to the above-described examples, and may be realized as various other types of electronic apparatuses which can be carried by a user.

The user terminal 100 according to various exemplary embodiments will be described with reference to FIGS. 2 to 4F.

Figure 2:
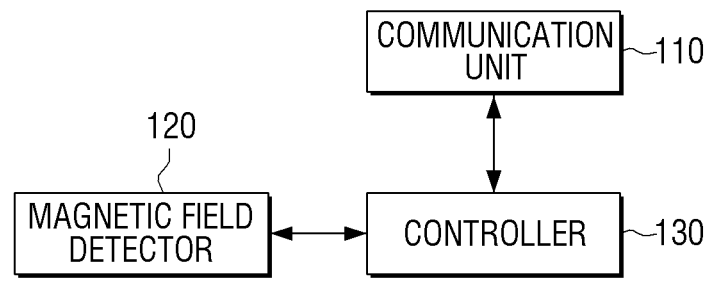
FIG. 2 is a block diagram illustrating a configuration of a user terminal according to an exemplary embodiment.

FIG. 2 is a block diagram illustrating a configuration of the user terminal 100 according to an exemplary embodiment.

As illustrated in FIG. 2, the user terminal 100 includes a communication unit 110 (e.g., communicator), a magnetic field detector 120 and a controller 130.

The communication unit 110 performs communication with various types of external apparatuses according to various types of communication methods. In particular, if a magnetic field generation command is input by a user, the communication unit 110 may transmit the magnetic field generation command to the external mobile terminal 200, and receive information regarding a maximum value and a minimum value of the magnetic field generated by the external mobile terminal 200.

The magnetic field detector 120 detects a magnetic field. For example, to detect the magnetic field, the magnetic field detector 120 may measure an azimuth angle by detecting the magnetic field which is formed in north and south directions of the Earth. According to an exemplary embodiment, the magnetic field detector 120 may be realized as a three-axis geo-magnetic sensor for measuring strength and direction of magnetism with respect to three axes which are crossed at right angles. The north direction measured by the magnetic field detector 120 may be a magnetic north. However, even if the magnetic field detector 120 measures a direction of the magnetic north, a direction of a true north may be output through an internal operation.

According to an exemplary embodiment, if the user terminal 100 is located within close range of the external mobile terminal 200 (e.g., within a predetermined range), and a predetermined motion is detected, the magnetic field detector 120 may obtain reference magnetic field information, and detect a magnetic field corresponding to identification information generated by the external mobile terminal 200. In addition, the user terminal 100 may detect a predetermined motion, and after being located within close range of the external mobile terminal 200, may detect a magnetic field corresponding to the identification information of the external mobile terminal 200.

The controller 130 may control the user terminal 100 and the external mobile terminal 200.

In particular, the controller 130 may control the magnetic field detector 120 to obtain reference magnetic field information of the user terminal 200. Subsequently, the controller 130 may control the magnetic field detector 120 to detect a magnetic field corresponding to the identification of the external mobile terminal 200. In this case, the user terminal 100 may obtain location information of the external mobile terminal 200 based on the obtained reference magnetic field information and the detected magnetic field. The identification information of the external mobile terminal 200 may be a quantized value between a maximum value and a minimum value of a magnetic field of the external mobile terminal 200.

Specifically, if the external mobile terminal 200 is located within close range of the user terminal 100, and a predetermined motion is detected, the controller 130 may obtain reference magnetic field information by removing the effect of an internal magnetic field. In this case, if a magnetic field generation command is input by a user, the controller 130 may transmit the magnetic field generation command to the external mobile terminal 200. Subsequently, the external mobile terminal 200 may emit a magnetic field between a maximum value and a minimum value for a predetermined time in response to the magnetic field generation command.

The controller 130 may control the communication unit 110 to receive information regarding a maximum value and a minimum value of a magnetic field of the external mobile terminal 200, and obtain the distance information indicating a distance between the user terminal 100 and the external mobile terminal 200 by comparing the received information regarding a maximum value and a minimum value of the magnetic field with the detected information regarding a maximum value and a minimum value of the magnetic field.

In addition, the user terminal 100 may obtain the direction information of the external mobile terminal 200 by comparing the reference magnetic field information with the detected magnetic field.

Figure 3:
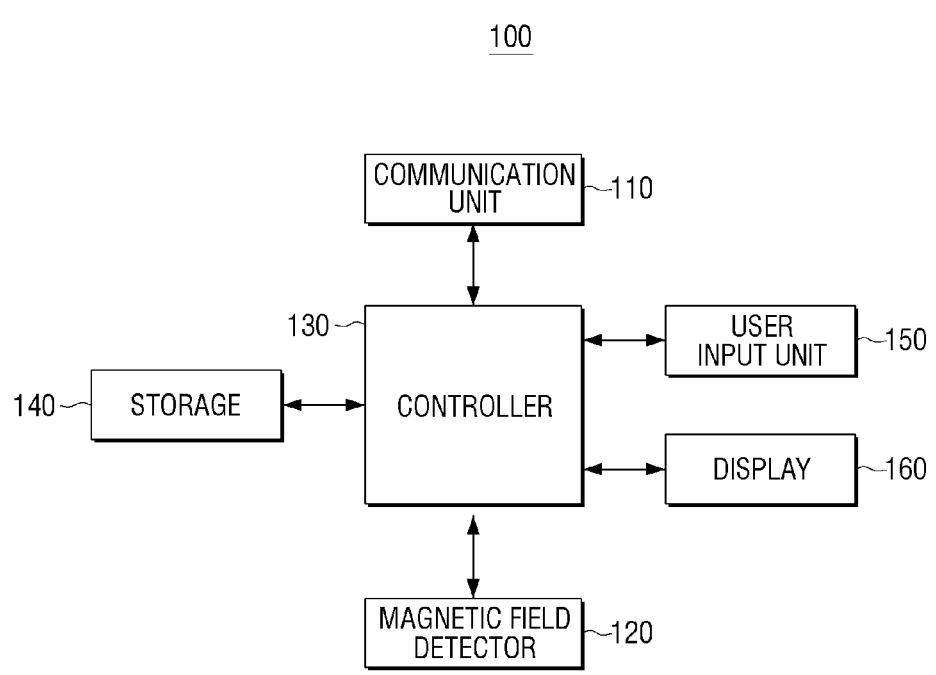
FIG. 3 is a block diagram illustrating a configuration of a user terminal in detail according to an exemplary embodiment.

FIG. 3 is a block diagram illustrating a configuration of the user terminal 100 in detail according to an exemplary embodiment.

As illustrated in FIG. 3, the user terminal 100 includes the communication unit 110, the magnetic field detector 120, a storage 140, a user input unit 150 (e.g., user inputter), and a display 160.

The communication unit 110 performs communication with various types of external apparatuses according to various types of communication methods. In particular, if a magnetic field generation command is input by a user, the communication unit 110 may transmit the magnetic field generation command to the external mobile terminal 200, and receive information regarding a maximum value and a minimum value of a magnetic field of the external mobile terminal 200.

According to an exemplary embodiment, the communication unit 110 performs communication with the external mobile terminal 200 primarily using an infrared ray communication method. However, this is only an example, and the communication unit 110 may perform communication with the external mobile terminal 200 using many other kinds of wireless communication technologies such as WiFi, Bluetooth, Radio Frequency (RF), IEEE 802.11, WLAN, HR WPAN, UWB, LR WPAN, IEEE 1394, and so on.

The magnetic field detector 120 detects a magnetic field as described above. In other words, the magnetic field detector 120 measures an azimuth by detecting a magnetic field formed in a north and south direction of the Earth. According to an exemplary embodiment, the magnetic field detector 120 may be realized as a three-axis geomagnetic sensor which measures the strength and direction of magnetism with respect to three axes which cross at right angles with one another. In an exemplary embodiment, the magnetic field detector 120 may detect a magnetic field of the external mobile terminal 200. Specifically, the direction of the strongest magnetic field can be detected by using a three-axis magnetic field sensor included in the magnetic field detector 120.

The storage 140 stores a program and data to drive the user terminal 100, and according to an exemplary embodiment, may store information regarding a maximum value and a minimum value of a magnetic field of the external mobile terminal 200. In addition, the storage 140 may store reference magnetic field information of the user terminal 100, a magnetic field corresponding to the identification information of the external mobile terminal 200, a magnetic field which is detected through the magnetic field detector 120, and the location information of the external mobile terminal 200 based on the reference magnetic field and the detected magnetic field.

The user input unit 150 receives various user commands to control the external mobile terminal 200. According to an exemplary embodiment, the user input unit 150 may be realized as a button. However, this is only an example, and the user input unit 150 may be realized as a touch screen or some other type of input device (e.g., sensors). According to an exemplary embodiment, if a magnetic field generation command is input through the user input unit 150, the controller 130 may control the communication unit 110 to transmit the magnetic field generation command to the external mobile terminal 200.

The display 160 may display image data and various user interfaces (UIs) under the control of the controller 130. According to an exemplary embodiment, if the display 160 is realized as a touch screen, a user command may be input through the touch screen. According to an exemplary embodiment, a UI for transmitting a magnetic field generation command to the external mobile terminal 200 located within close range of the user terminal 200 may be displayed in the display 160. In addition, a UI regarding the obtained location information and identification information of the external mobile terminal 200 may be displayed by the display 160.

The controller 130 may control the user terminal 100 and the external mobile terminal 200.

In particular, the controller 130 may obtain reference magnetic field information of the user terminal 100 through the magnetic field detector 120. Subsequently, the controller 130 may control the magnetic field detector 120 to detect a magnetic field corresponding to the identification information of the external mobile terminal 200. According to an exemplary embodiment, the controller 130 may obtain the location information of the external mobile terminal 200 based on the reference magnetic field information and the detected magnetic field.

Specifically, if the user terminal 100 is located within close range of the external mobile terminal 200 and a predetermined motion is detected by the user terminal 100, the controller 130 may obtain reference magnetic field information by removing the effect of an internal magnetic field of the user terminal. According to an exemplary embodiment, as illustrated in FIG. 4A, a user may determine that the user terminal 100 is located within close range of the external mobile terminal 200 by using a WiFi communication network, a Global Positioning System (GPS), or other types of devices implemented as part of the communication unit 110. Subsequently, if a user shakes the user terminal 100 in the form of the number '8' (a correction method), the controller 130 may obtain reference magnetic field information by removing the effect of an internal magnetic field of the user terminal 100. It is understood that the exemplary embodiments are not limited to shaking the user terminal 100 in the form of the number '8', and that many other types of movement patterns may also be used.

Figure 4B:
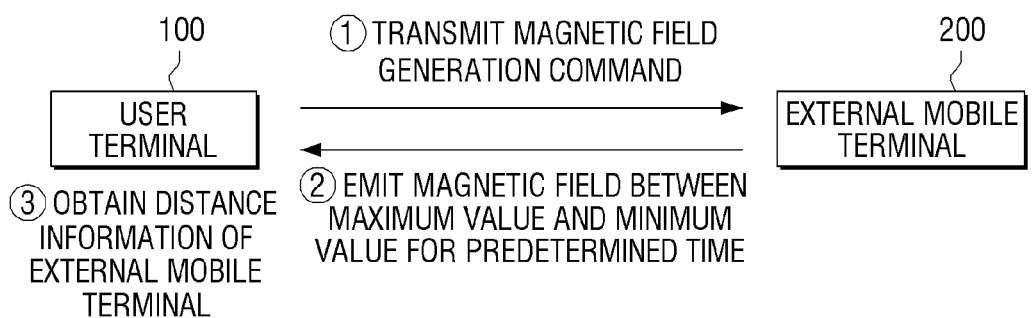
Figure 4C:
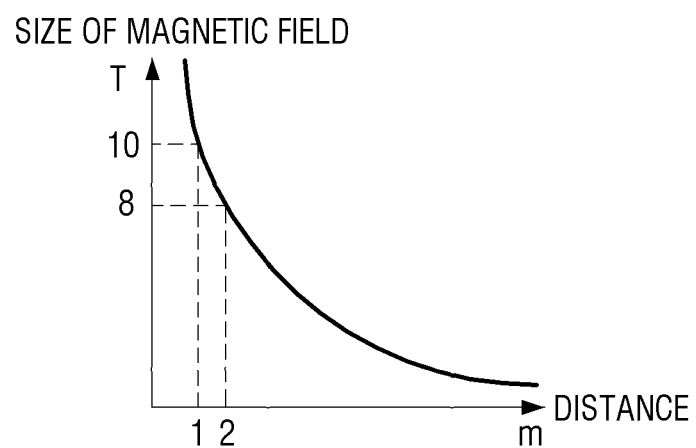
Figure 4D:
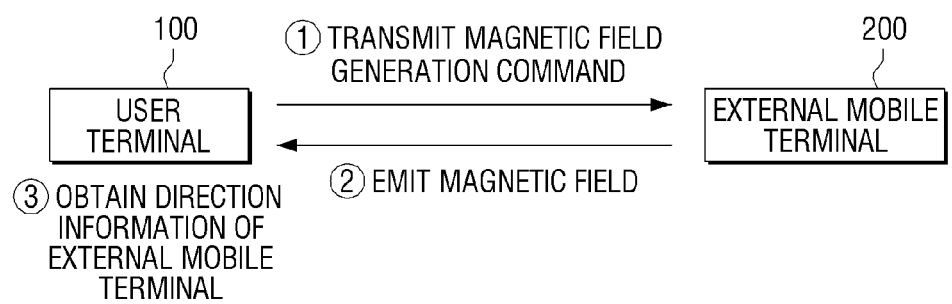
Figure 4E:
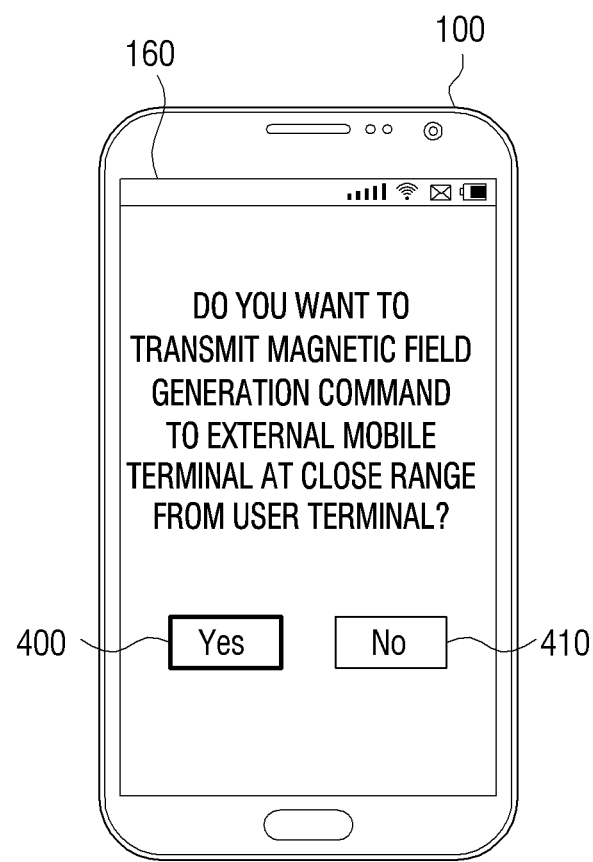
FIG. 4E is a view provided to explain an operation of displaying a User Interface (UI) for transmitting a magnetic field generation command to an external mobile terminal on a screen of a user terminal.

According to an exemplary embodiment, if a magnetic field generation command is input through the user input unit 150, the controller 130 may control the communication unit 110 to transmit the magnetic field generation command to the external mobile terminal 200. In this case, as illustrated in FIG. 4E, the controller 130 may detect that the user terminal 100 is located within close range of the external mobile terminal 200, and display a UI asking the user "do you want to transmit a magnetic field generation command to external mobile terminal at close range from user terminal?" in the display 160. The user may input 'Yes' by pressing the button 400 or 'No' by pressing the button 410. If a user inputs 'Yes' by pressing the button 400, the controller 130 may transmit a magnetic field generation command to the external mobile terminal 200. It is understood that the UI may display many other types of messages different from the exemplary message shown in FIG. 4E.

According to the above exemplary embodiment, the user terminal 100 is positioned to be located within close range of the external mobile terminal 200, and then a predetermined motion is detected. However, in another exemplary embodiment, the user terminal 100 may detect a predetermined motion and obtain reference magnetic field information, and then, may transmit a magnetic field generation command to the external mobile terminal 200 after the system determines that the user terminal 200 is located within close range of the external mobile terminal 200 by using a WiFi communication network, GPS, and so on.

In response to the magnetic field generation command, the external mobile terminal 200 may emit a magnetic field between a maximum value and a minimum value for a predetermined time. Subsequently, the controller 130 may control the communication unit 110 to receive information regarding a maximum value and a minimum value of a magnetic field of the external mobile terminal 200, and obtain the distance information of the external mobile terminal 200 by comparing the information on the maximum value and the minimum value which is detected through the magnetic field detector 120. Specifically, as illustrated in FIG. 4B, the controller 130 may control the communication unit 110 to transmit a magnetic field generation command to the external mobile terminal 200 (operation ①). Then, the external mobile terminal 200 may emit a magnetic field between a maximum value and a minimum value for a predetermined time in response to the magnetic field generation command (operation ②). The controller 130 may detect a maximum value and a minimum value through the magnetic field detector 120. Then, the controller 130 may obtain the distance information of the external mobile terminal 200 by comparing the previously-received information regarding a maximum value and a minimum value with the information regarding the detected maximum value and minimum value. In other words, the controller 130 may obtain the distance information indicating a distance between the user terminal 100 and the external mobile terminal 200 by using the correlation between the size and distance of a magnetic field (the size of a magnetic field is inversely proportional to the square of the distance). For example, as illustrated in FIG. 4C, if the received maximum value of the magnetic field is 10, the corresponding distance is 1 m, and the detected maximum value of the magnetic field is 8, the controller 130 may determine that the distance corresponding to the detected maximum value of the magnetic field (8) is 1 m with reference to the received maximum value (10) of the magnetic field (2 m of distance).

As described above, the information regarding a reference maximum value and a reference minimum value may be received through the communication unit 110, and the information may be a maximum value and a minimum value which are pre-stored in the storage 140.

According to an exemplary embodiment, the controller 130 may obtain the distance information of the external mobile terminal 200 by comparing the obtained reference magnetic field information and the magnetic field which is detected through the magnetic field detector 120. Specifically, as illustrated in FIG. 4D, the controller 130 may control the communication unit 110 to transmit a magnetic field generation command to the external mobile terminal 200 (operation ①). Then, the external mobile terminal 200 may emit a magnetic field in response to the magnetic field generation command (operation ②). The controller 130 may obtain the direction information of the external mobile terminal 200 by comparing the obtained reference magnetic field information and the detected magnetic field information. In this case, the controller 130 may control the magnetic field detector 120 to detect the direction of the magnetic field with the strongest magnetic force. For example, if the reference magnetic field information is '0', and 40 T in the northwest direction is detected through the magnetic field detector 120, the controller 130 may control the magnetic field detector 120 to detect that the direction of the strongest magnetic field is 40 T in the northwest direction. In other words, the controller 130 may determine that the direction of the external mobile terminal 200 is northwest.

Figure 4F:
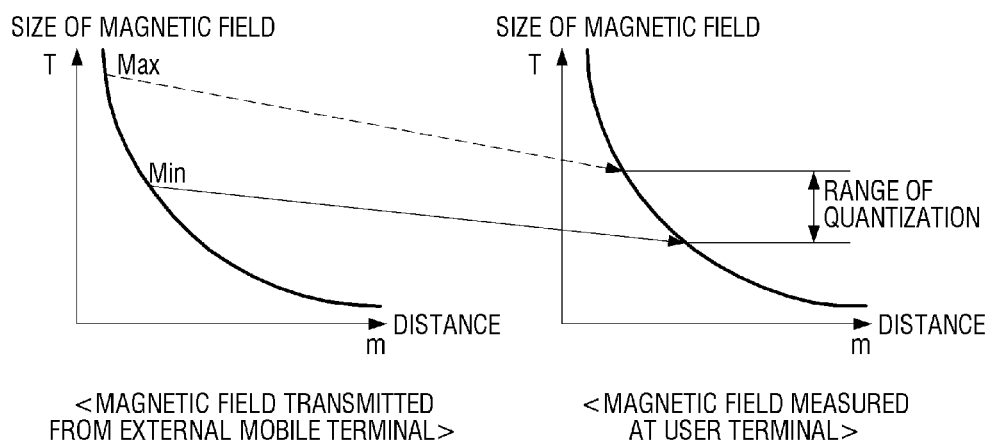
FIG. 4F is a view illustrating a graph to explain a quantized value of a magnetic field which is received in a user terminal according to an exemplary embodiment.

According to an exemplary embodiment, the controller 130 may control the magnetic field detector 120 to detect a magnetic field corresponding to the identification information of the external mobile terminal 200. In this case, the identification information of the external mobile terminal 200 may be a quantized value between a maximum value and a minimum value of a magnetic field generated by the external mobile terminal 200. Specifically, as illustrated in FIG. 4F, if the intrinsic identification information of a magnetic field of the external mobile terminal 200 is '12345670' which is an octal number, '12345670' may be emitted for a predetermined time in the size of each magnetic field which is quantized between a maximum value and a minimum value. The controller 130 may control the magnetic field detector 120 to detect a magnetic field for a predetermined time, and convert the quantized magnetic field to intrinsic identification information using the correlation between the size and the distance of the magnetic field. It is understood that many other types of intrinsic identification information may be used instead of '12345670'.

Figure 5:
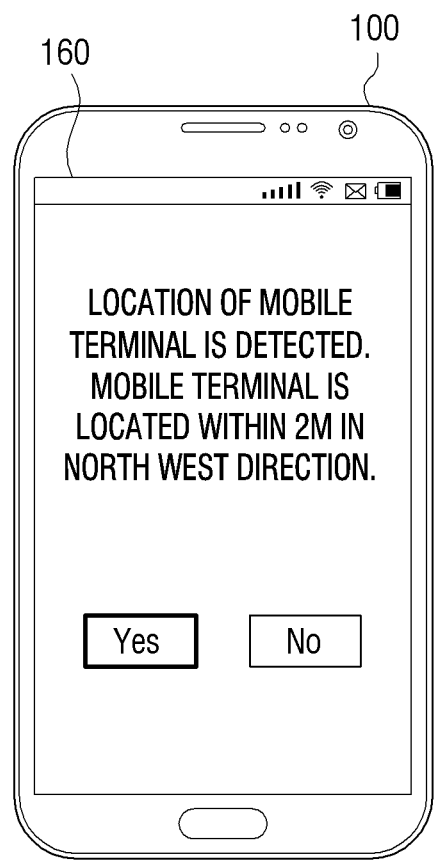
FIG. 5 is a view provided to explain an operation of displaying a UI for obtaining location information of an external mobile terminal on a screen of a user terminal.

According to an exemplary embodiment, the controller 130 may control the display 160 to display the obtained location information and identification information of the external mobile terminal 200. Specifically, as illustrated in FIG. 5, the controller 130 may control the display 160 to display a UI indicating that the location of a mobile terminal is detected. The mobile terminal is located within 1 m in the northwest direction,' or something similar.

Figure 6:
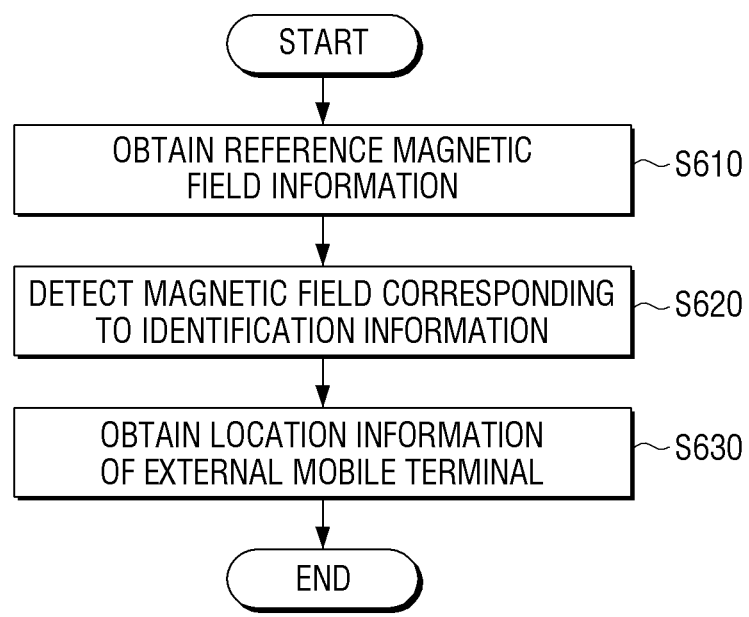
FIG. 6 is a flowchart provided to explain an operation of obtaining a location of an external mobile terminal using a user terminal.

FIG. 6 is a flowchart provided to explain an operation of obtaining the location of an external mobile terminal using a user terminal.

According to FIG. 6, the user terminal 100 may obtain reference magnetic field information of the user terminal 100 at operation S610. As described above, if the user terminal 100 is located within close range of the external mobile terminal 200 and a predetermined motion is detected, the user terminal 100 may obtain reference magnetic field information by removing the effect of an internal magnetic field.

After obtaining the reference magnetic field information of the user terminal 100, the user terminal 100 may detect a magnetic field corresponding to the identification information transmitted from the external mobile terminal 200 at operation S620.

The user terminal 100 may obtain the location information of the external mobile terminal by comparing the reference magnetic field information and the detected magnetic field information at operation S630.

The controller 130 may obtain the distance information of the external mobile terminal 200 by using the correlation between the size and the distance of a magnetic field (the size of a magnetic field is inversely proportional to the square of the distance). For example, as illustrated in FIG. 4C, if the received maximum value of the magnetic field is 10 T, the corresponding distance is 1 m, and the detected maximum value of the magnetic field is 8 T, the controller 130 may determine that the distance corresponding to the detected maximum value of 8 of the magnetic field is 1 m with reference to the received maximum value of 10 T (the distance of 2 m) of the magnetic field.

In addition, as illustrated in FIG. 4D, the controller 130 may control the communication unit 110 to transmit a magnetic field generation command to the external mobile terminal 200 at operation ①. Then, the external mobile terminal 200 may emit a magnetic field in response to the magnetic field generation command at operation ②. The controller 130 may obtain the direction information of the external mobile terminal 200 by comparing the obtained reference magnetic field information and the detected magnetic field information. In this case, the controller 130 may control the magnetic field detector 120 to detect the direction of a magnetic field with the strongest magnetic force. For example, if the reference magnetic field information is '0', and 8 T in the northwest direction is detected through the magnetic field detector 120, the controller 130 may control the magnetic field detector 120 to detect that the direction of the strongest magnetic field is 8 T in the northwest direction. In other words, the controller 130 may determine that the direction of the external mobile terminal 200 is northwest.

FIG. 7 is a sequence view provided to explain an operation of a location tracking system according to an exemplary embodiment. According to FIG. 7, the user terminal 100 may obtain reference magnetic field information at operation S710). Subsequently, if a magnetic field generation command is input from a user, the magnetic field generation command may be transmitted to the external mobile terminal 200 at operation S720.

Then, the external mobile terminal 200 may emit a magnetic field between a maximum value and a minimum value for a predetermined time in response to the magnetic field generation command at operation S730.

The user terminal 100 may obtain the location information (direction and distance information) of the external mobile terminal 200 based on the reference magnetic field information and the detected magnetic field at operation S740. Specifically, the user terminal 100 may obtain the distance information of the external mobile terminal 200 by comparing the received maximum value and minimum value of the magnetic field and the detected maximum and minimum value information of the magnetic field. As described above, the controller 130 may obtain the distance information of the external mobile terminal 200 by using the correlation between the size and the distance of a magnetic field (the size of a magnetic field is inversely proportional to the square of the distance). In addition, the user terminal 100 may obtain the direction information of the external mobile terminal 200 by comparing the obtained reference magnetic field information and the detected magnetic field. The controller 130 may detect the direction of the external mobile terminal 200 by detecting the direction of a magnetic field with the strongest magnetic force through the magnetic field detector 120.

Subsequently, the user terminal 100 may display the obtained location and identification information at operation S750). According to an exemplary embodiment, as illustrated in FIG. 5, the controller 130 may control the display 160 to display a UI indicating that 'the location of a mobile terminal is detected. The mobile terminal is located within 2 m in the northwest direction.' It is understood that the UI may include many other types of messages different from the exemplary message shown in FIG. 5.

A program code to perform the method of controlling a user terminal according to the various exemplary embodiments may be stored in a non-transitory computer readable medium. According to an exemplary embodiment, the non-transitory computer readable medium refers to a medium which may store data semi-permanently rather than storing data for a short time such as a register, a cache, and a memory and may be readable by an apparatus. Specifically, the non-transitory computer readable recording medium may be, for example, a CD, a DVD, a hard disk, a Blu-ray disk, a USB, a memory card, a ROM, etc.

The foregoing exemplary embodiments and advantages are merely exemplary and are not to be construed as limiting the present invention. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for controlling a user terminal, comprising:
    in response to a user input for generating a magnetic field being received, transmitting a magnetic field generation command to an external mobile terminal;
    obtaining reference magnetic field information of the user terminal;
    detecting a magnetic field emitted from the external mobile terminal; and
    obtaining location information indicating a location of the external mobile terminal based on the reference magnetic field information and the detected magnetic field.

2. The method as claimed in claim 1, wherein the obtaining of the reference magnetic field information of the user terminal comprises removing an effect of an internal magnetic field of the user terminal in response to a predetermined motion of the user terminal being detected by the user terminal.

3. The method as claimed in claim 2, wherein the obtaining of the reference magnetic field information of the user terminal comprises detecting the predetermined motion of the user terminal after the user terminal is detected as being within a predetermined range of the external mobile terminal.

4. The method as claimed in claim 1,
    wherein the external mobile terminal emits a magnetic field between a maximum value and a minimum value in response to the magnetic field generation command.

5. The method as claimed in claim 4, wherein the user terminal receives information regarding a maximum value and a minimum value of the magnetic field emitted by the external mobile terminal, and
    wherein the obtaining of the location information indicating a location of the external mobile terminal comprises obtaining distance information of the external mobile terminal by comparing the received information regarding the maximum value and the minimum value of the magnetic field with maximum value information and minimum value information of the detected magnetic field.

6. The method as claimed in claim 1, wherein the obtaining of the location information indicating a location of the external mobile terminal comprises obtaining direction information of the external mobile terminal by comparing the reference magnetic field information with the detected magnetic field.

7. The method as claimed in claim 1, further comprising obtaining identification information of the external mobile terminal, the identification information being a quantized value between a maximum value and a minimum value of the magnetic field emitted from the external mobile terminal.

8. The method as claimed in claim 1, further comprising:
    obtaining identification information of the external mobile terminal corresponding to the detected magnetic field; and
    displaying the obtained location information and the obtained identification information of the external mobile terminal.

9. A user terminal, comprising:
    a magnetic field detector configured to detect a magnetic field;
    a communicator configured to communicate with an external mobile terminal; and
    a processor configured to:
    in response to a user input for generating a magnetic field being received, control the communicator to transmit a magnetic field generation command to the external mobile terminal,
    obtain reference magnetic field information of the user terminal using the magnetic field detector,
    in response to detecting a magnetic field emitted from the external mobile terminal through the magnetic field detector, obtain location information indicating a location of the external mobile terminal based on the reference magnetic field information and the detected magnetic field.

10. The user terminal as claimed in claim 9, wherein the processor is configured to obtain the reference magnetic field information by removing an effect of an internal magnetic field of the user terminal in response to a predetermined motion of the user terminal being detected by the user terminal.

11. The user terminal as claimed in claim 9, wherein in response to the user terminal being within a predetermined range of the external mobile terminal and a predetermined motion of the user terminal being detected by the user terminal, the processor is configured to obtain the reference magnetic field information.

12. The user terminal as claimed in claim 9,
    wherein the magnetic field generation command is configured to control the external mobile terminal to emit the magnetic field between a maximum value and a minimum value in response to the magnetic field generation command.

13. The user terminal as claimed in claim 12, wherein the user terminal is configured to receive information regarding a maximum value and a minimum value of the magnetic field which is emitted by the external mobile terminal, and wherein the processor is configured to obtain distance information of the external mobile terminal by comparing the received information regarding the maximum value and the minimum value of the magnetic field with maximum value information and minimum value information of the detected magnetic field.

14. The user terminal as claimed in claim 9, wherein the processor is configured to obtain direction information of the external mobile terminal by comparing the reference magnetic field information with the detected magnetic field.

15. The user terminal as claimed in claim 9, wherein the processor is further configured to obtain identification information of the external mobile terminal, the identification information being a quantized value between a maximum value and a minimum value of the magnetic field which is emitted by the external mobile terminal.

16. The user terminal as claimed in claim 1, wherein the processor is further configured to obtain identification information of the external mobile terminal corresponding to the detected magnetic field, wherein the user terminal further comprises:
a display configured to display the obtained location information and the obtained identification information of the external mobile terminal.

17. The user terminal as claimed in claim 9, further comprising:
a movement detector configured to detect motion of the user terminal,
wherein the processor is configured to determine the location of the external mobile terminal in response to determining that the detected motion corresponds to a predetermined motion and detecting a magnetic field emitted from the external mobile terminal through the magnetic field detector.

18. The user terminal as claimed in claim 17, wherein the predetermined motion is motion in the form of the number 8.

19. The user terminal a claimed in claim 17, wherein the processor controls the movement detector to detect the motion of the user terminal determining that the user terminal is within a predetermined range of the external mobile terminal.

20. The user terminal as claimed in claim 17, wherein the processor determines the location of the external mobile terminal based on a comparison between maximum and minimum values of the detected magnetic field, and previously stored maximum and minimum values.

\* \* \* \* \*